May 24, 1966  R. G. RUSSELL ETAL  3,252,814

CRYSTALLINE FIBERS

Filed Sept. 6, 1962

INVENTORS
ROBERT G. RUSSELL,
WILLARD L. MORGAN &
BY LEWIS F. SCHEFFLER

*Haskin & Overman*
ATTORNEYS

United States Patent Office 3,252,814
Patented May 24, 1966

3,252,814
CRYSTALLINE FIBERS
Robert G. Russell, Granville, Ohio, Willard L. Morgan, Spartanburg, S.C., and Lewis F. Scheffler, Newark, Ohio, assignors to Owens-Corning Fiberglas Corporation, a corporation of Delaware
Filed Sept. 6, 1962, Ser. No. 221,850
21 Claims. (Cl. 106—57)

This application is a continuation-in-part of our co-pending application, Serial Number 31,964, now Patent No. 3,065,091.

This invention relates to the production of crystalline fibers and more particularly to a process for producing highly refractory acicular crystalline bodies.

Acicular crystals or crystalline fibers, either alone or in bundles, have a high modulus, are extremely strong, can be highly refractory, withstanding temperatures of the order of 3000° F. or higher, and, in some instances, have properties which make them suitable for semi-conductor and transistor applications. In the field of missiles and high speed aircraft, the fibers are particularly suitable for use in rocket nozzles, diffusers, heat shields, and as a reinforcement for skins of aerodynamic bodies. The properties of the fibers also make them particularly suitable for reinforcing materials made into sleeves used as cylinder walls of aircraft engines. Because of their strength and high modulus, the fibers are excellent for reinforcing plastics, cements, ceramics, gypsum, and graphite, including pyrolytic graphite. The fibers are also effective for use as high temperature insulation and are highly corrosion resistant. They also constitute effective internal liners for the components of vehicle muffling systems and components for burners.

The present invention relates to a process for forming crystalline fibers of pure titania, zirconia, zircon, as determined by X-ray diffraction. The new process enables the production of crystalline fibers in relatively inexpensive equipment free of corrosion problems and at relatively rapid rates. The crystals produced are substantially entirely of the crystal-forming material with which the process was started, uncontaminated by other materials used in the process.

In accordance with a specific embodiment of the invention, a material capable of forming acicular crystals, particularly titania, zirconia, and zircon, is combined with a matrix of boric acid, borax, or both, and melted at a sufficiently high temperature to cause all of the crystal-forming material to go into solution or form a homogeneous melt. The resulting melt or solid solution is then cooled to and through a temperature range in which crystals form. During the process the liquid can be thermally or otherwise agitated and moved or flowed past the crystals as they form, in a direction parallel to their longitudinal extent and direction of growth. Control of cooling conditions may provide either short or long crystals. After a substantial part of the crystal-forming material has crystallized on portions of the crystals which have already formed, the combination is cooled to ambient temperature. The matrix can then be separated, leaving the individual, separate fibers, or the fibers can be left in the matrix so as to constitute a strong, reinforced body. The resulting crystalline fibers are composed only of the crystal-forming material and are free of the materials constituting the matrix as determined by X-ray diffraction. The crystals are especially useful for reinforcement purposes because they can be made much longer than those heretofore produced. The process requires no special, costly equipment which is often necessary for the formation of acicular crystals and can be employed to produce fibers continuously at relatively high production rates.

It is, therefore, a principal object of the invention to provide a process for producing crystalline fibers having high strength and having highly refractory characteristics.

Another object of the invention is to produce crystalline fibers that can be relatively long or very small as desired.

Still another object of the invention is to provide a process for making crystalline fibers which consist essentially of the crystal-forming material used in the process.

A further object is to provide an article comprising acicular crystals in a solid phase, vitreous matrix.

Other objects and advantages of the invention will be apparent from the following detailed description of preferred embodiments thereof, reference being made to the accompanying drawing, in which.

Figure 1:
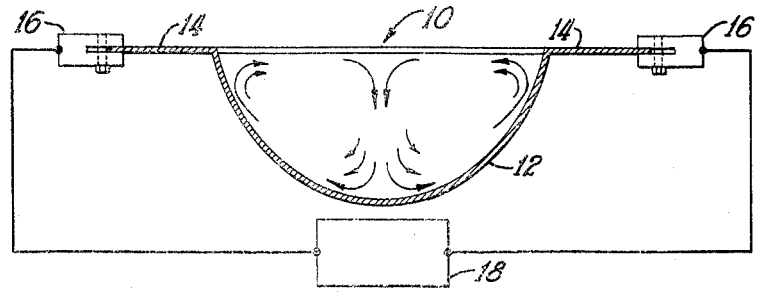
FIG. 1 is a view in vertical cross section of a melter suitable for use in a process embodying the principles of the invention, the melter being shown with a homogeneous melt therein at an elevated temperature.

According to a specific embodiment of the invention, a six pound charge made up of equimolecular proportions of titania ($TiO_2$), boric anhydride ($B_2O_3$) and borax ($Na_2B_4O_7$), was heated to and held at 2450 to 2500° F. for a period of approximately one-half hour in a gas fired furnace, until the titania was thoroughly dissolved in, or formed a homogeneous liquid with, the boric acid and borax. The melt was then cooled by cooling the furnace at a rate of about 30° F. per minute to approximately 2300° F., which temperature was above the maximum for formation of either nuclei or crystals of $TiO_2$. The melt was then cooled at a slower rate by cooling the furnace at a rate of about 15° F. per minute to a temperature of about 2220° F., which is in the upper end of the range in which nuclei form, frequently termed the nucleation range. At this temperature a small crystal was visible in the melt. The temperature of the melt then was increased slightly, approximately 20° F., to about 2240° F. to decrease the number of nuclei formed and was then cooled at a slow rate of 2° F. per minute to cause the crystals to continue to grow primarily upon the few nuclei present without forming additional nuclei to any large extent. When a temperature of 1800° F. was reached, firing of the furnace was discontinued, and the melt was cooled to ambient temperature of about 70° F. The matrix was then dissolved or washed away from the crystalline fibers, with the aid of a hot water spray, to complete the process and leave the bare crystalline fibers. These fibers, many of which exceeded four inches in length, were shown by X-ray diffraction analysis to be composed entirely of titania, free of any matrix compounds.

A similar batch of 12 pounds of the same ingredients in the same ratio was melted at 2400° F. in a furnace and then pulled out and cooled in air. In a temperature range between approximately 2000° F. and 1800° F. rapid crystal growth upon the few nuclei occurred with formation of large crystals which were subsequently recovered from the matrix. This melt had sufficient mass and contained sufficient heat to enable cooling to be slow enough to take place in the air, rather than in the furnace.

A similar batch melted at 2400° F. was cooled to a temperature range of 2100° F. to 2150° F. in which nuclei formation rate was a maximum. Air was bubbled into the mass to provide agitation and quick equalization of temperature throughout the mass. This air also provided a nucleation surface at each bubble and the titania quickly formed extremely large numbers of very small crystals which were afterwards recovered from the matrix.

The various sizes of crystal fiber products may thus be produced and some of the smaller sized products are of interest as providing heat insulated felted materials.

In any of the above three recited examples if the heating steps are done in an oxidizing atmosphere such as gas heating with 11 parts or more of air per volume of gas the titania crystals recovered are yellow but if a reducing condition such as 1 part gas to 9 of air is employed the crystals are blue.

With boric acid alone as a matrix, 3%, by weight, titania was added to boric acid or boric anhydride and melted at approximately 2450° F. The resulting melt was cooled at a rate of approximately 80° F. per hour to 1800°–1900° F. with crystals growing therein in a temperature range of approximately 2150°–2250° F. The matrix and crystals were then cooled to ambient.

Zirconia fibers were made by combining zirconia, boric anhydride, and borax in equimolar proportions and heating the mixture to 2650° F. for a period of approximately one-half hour. The melt was then cooled at a rate of approximately 30° F. per minute to approximately 2200° F. and then was cooled at a slower rate of about 10° F. per minute to a temperature of about 2130° F. at which a small crystal was visible in the melt. Cooling was then continued at an even slower rate of 5° F. per minute to continue crystal growth. When a temperature of 1700° F. was reached, the melter was shut off and cooled to ambient temperature. The fibers were then extracted in the same manner as was done with the titania melt. Many of the resulting fibers exceeded one inch in length and were shown by X-ray diffraction to be made of zirconia free of any of the matrix.

Zirconia crystals have also been made with boric acid alone as a matrix material. Boric acid or boric anhydride and 1%, by weight, zirconia were melted at 2650° F. and cooled at a rate of 20° F. per hour to approximately 2000°–2100° F., then being cooled in air to ambient. The crystals began to appear in the melt at 2450° F.

Both zircon and zirconia crystals were made in a single melt by employing zircon, boric anhydride, and borax in equimolar proportion. A crystal-forming technique was employed similar to that used with the above-discussed zirconia melt, both zircon and zirconia fibers, many of which were over an inch in length, being obtained in this process. The fibers were identified by X-ray diffraction studies.

Mixed acicular crystals of titania and zirconia can also be obtained if some of each is added to the boric acid and borax melts and cooled as above. When a final product is desired in which the crystals and matrix are left in combined form, the extraction process being eliminated, the use of zirconia and titania in a single melt is particularly advantageous. In such an instance, longer titania fibers and shorter zirconia fibers are produced which provide a stronger reinforced matrix than is possible by using either crystal-forming material alone.

The optimum temperature for original melting and the optimum time during which the mixture is held at that temperature depend upon the crystal-forming material employed, upon its concentration, and upon the ratio of the borax and boric acid. In general, the higher the temperature at which the mixture is melted, the greater is the amount of crystal-forming material that can be dissolved. However, as the temperature and time are increased and the surface exposed per unit of weight is increased, the soda of the borax as well as some of the boric oxide tends to be driven off or volatilized and causes the total solution capacity of the remaining matrix for the crystal-forming material to be lowered. For example, a 12 pound melt of titania, borax, and boric acid in equimolar proportions incurred a 1% weight loss when melted at 2450° F. for approximately one-half hour in a six inch bowl. Thus, there will be an optimum combination of temperature and time for any particular melt at which a maximum amount of material will be dissolved. The period of time in which the melt will be held at the particular temperature will also vary and need only be long enough to assure that all of the crystal-forming material is in substantially complete solution.

The temperature to which the melt is then cooled is not a critical one but is sufficiently high to assure that it will be above the range in which nuclei will form and crystallization will result. When longer crystals are desired, the melt is then cooled at a slow rate to the upper end of the nucleation range to prevent entry into this range too rapidly which would cause a rapid formation of many nuclei and the growth of many small crystals. This range will depend upon the crystal-forming material being used and will vary for any particular crystal-forming material. However, titania, zircon, and zirconia all have nucleation ranges in which nuclei tend to form but in which little growth of each occurs, and also a crystal-growth range above the nucleation range, at least in the case of titania, in which few additional nuclei form but in which each nuclei grows larger as a crystal. The two ranges may overlap to some extend or may be spaced apart but in either case the ranges will decrease in temperature as additional crystal-forming material comes out of solution. When large crystals are desired, the matrix and crystal-forming materials will be cooled to and maintained at a temperature closer to the crystal-forming range and where small crystals are desired, the matrix and crystal-forming materials will be cooled to and maintained at a temperature in a center portion of the nucleation range. In the case of titania, the upper end of the nucleation range will vary from approximately 2190° F. to 2250° F. depending on the purity of the melt, the purity of the atmosphere above the melt, and the nature and purity of the material of which the melter is made, and the presence of any inert, non-dissolved foreign substances.

When the materials are maintained at elevated temperature to form a homogeneous melt, with large exposed surface per unit of weight, and when they are being cooled at about 2300° F. some of the soda and boric oxide volatilize rapidly to a greater degree than above-indicated to reduce the solubility of the crystal-forming material in the melt and to enable crystallization to take place readily when the nucleation range is reached.

Because titania crystals tend to grow rapidly, the temperature of the titania melt preferably is slightly increased when the first crystal is visible to prevent the possibility of rapid growth of too many small crystals. This is prevented because the temperature is raised to a point further into the crystal-growing range wherein crystals still have a tendency to grow but where no additional crystals tend to form. Any new nuclei or small crystals that do form within this temperature range immediately redissolve and migrate eventually to the few larger crystals in the melt.

As more of the titania crystallizes on the partially formed acicular crystals or crystalline fibers, both the nucleation and crystal-growing ranges tend to decrease so that the temperature of the melt can continually be decreased in order to continue crystal which is continued after the nuclei are formed, in order to continue crystal growth mainly upon the initial nuclei. The cooling which is continued after the nuclei are formed, in order to continue the growth thereof, must be commensurate with the drop in temperature of the crystal-growing range and with the rate of growth when longer crystals are desired. If the temperature is decreased too rapidly, the nucleation range will be penetrated excessively and excessive nucleation will result, with a larger number of smaller crystals being formed. This latter rate of cooling is continued until a point is reached at which the rate of growth of the crystals is so slow that it is no longer feasible to continue crystal growth, the rate of growth decreasing as the temperature is dropped. When this point is reached, the melt and crystalline fibers are cooled to room temperature at a suitable, rapid rate. The point at which the rapid rate of cooling is started is preferably above 1600° F. the melter then being shut off and cooled in air.

While the crystals are forming in the melt, it can be circulated in a direction parallel to the growth direction or longitudinal extent of the crystals. This helps the titania or other crystal-forming compound in the melt to deposit on the ends of the partially-formed, acicular crystals and aids in their acicular growth. Thus, titania, which can grow in brookite or anatase crystalline shapes, is urged to grow in its acicular or rutile form by the process of the invention.

Figure 2:
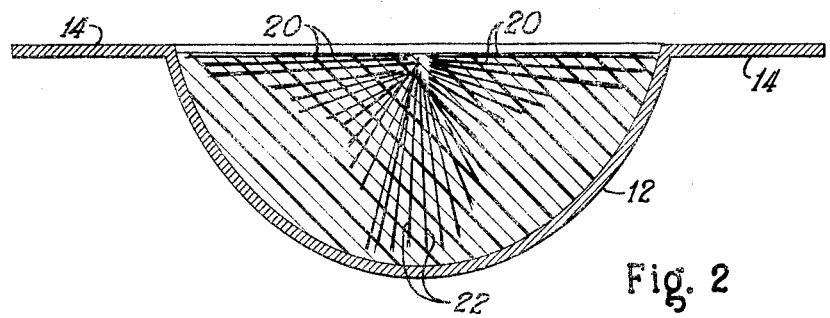
FIG. 2 is a view in cross section similar to FIG. 1, but on a slightly enlarged scale, of the melter containing a combination of crystalline fibers and a matrix.
Figure 3:
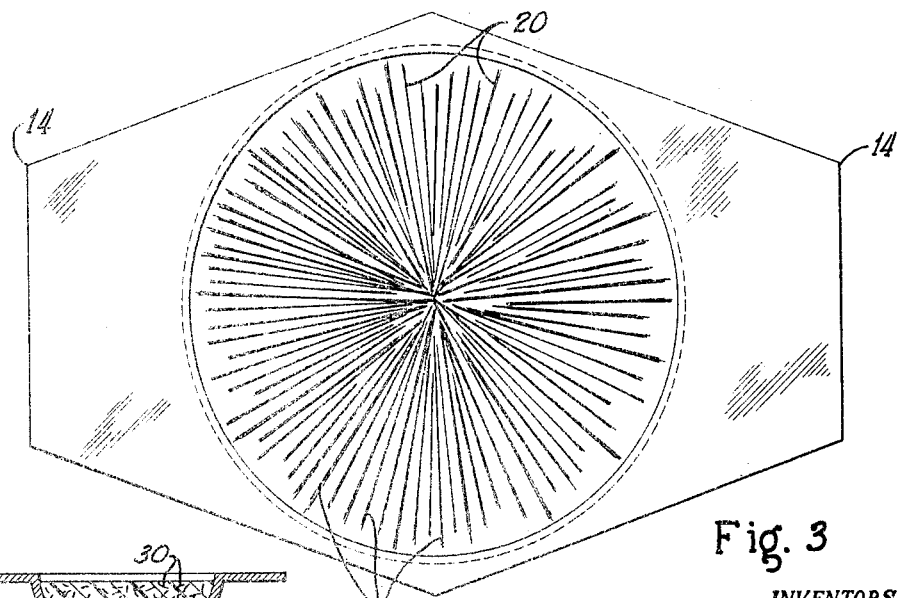
FIG. 3 is a top view of the melter of FIG. 2 and further showing the distribution of the crystalline fibers therein.
Figure 4:
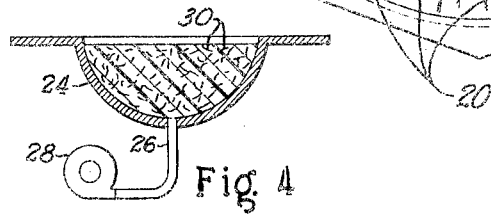
FIG. 4 is a view in cross section of a modified melter containing a combination of short crystalline fibers and a matrix.

One specific form of a melter for obtaining this effect is shown in FIGS. 1–3 of the accompanying drawing. This melter, which is designated 10, includes a crucible or bowl 12 having a generally circular horizontal cross-sectional shape, with integral flanges 14 extending outwardly on opposite sides thereof. Terminals 16 attached to the ends of the flanges 14 are electrically connected with a source of power 18 to heat the crucible 12 by resistance. The high, substantially uniform temperature of the wall forming the crucible 12, which is preferably of platinum or other highly refractory material, causes liquid contained therein to flow in the directions shown in FIG. 1. The flow is upwardly and outwardly along the walls, then substantially radially inwardly, and then downwardly to a lower, central part of the crucible 12 from which the upward and outward flow along the walls again commences. The crystals, as shown in FIGS. 2 and 3, are grown principally in directions parallel to the flow of the liquid in the crucible 12. Crystals 20 at the surface of the liquid are grown generally radially outwardly, as best shown in FIG. 3, in a direction parallel to the flow of the matrix and crystal-forming material, but opposite thereto. Crystals 22 below the surface of the liquid are grown in a direction which again is generally parallel to the direction of flow of the liquid but in the same direction. Because counterflow is more effective in depositing the crystal-forming material on the crystals, the crystals 20 are generally longer than the crystals 22. In actual practice, the crystals have been grown in length over four inches, the principal limitation being the quantity of molten mass employed and the size of the crucible used. As the crystals grow in length, their diameters also increase slightly but to a much lesser extent.

Where small crystals are desired, the melt can be cooled more rapidly to a temperature in a central portion of the nucleation range and below the crystal-forming range with many small crystals resulting. The number of nuclei formed can also be increased by agitating the melt as it is cooled, which can be accomplished by blowing air or inert gas through it or by vibrating the crucible, for example. A crucible 24 of FIG. 4 is provided with an air line 26 for this purpose with air being supplied from a suitable source, such as a blower 28. When a homogeneous melt is attained, it is cooled to the nucleation range and during the cooling air is bubbled through the melt. The air agitates the melt with the air bubbles possibly acting as points on which nuclei can from with many small crystals 30 resulting. The matrix can then be removed when the melt is cooled to ambient or the combination matrix and crystal-forming material can be used as a reinforced body. In the latter instance, the crucible 24 can be formed in the shape of the desired body to act, in effect, as a mold.

While the use of one mole each of boric acid and borax is not critical, this ratio provides viscosity and surface tension in the melt which enables the crystal-forming material to crystallize initially on top of the melt where the crystals grow the longest and are also spaced farthest from the walls of the crucible. This is advantageous because the crucible walls often provide nucleating points and if growth began there, a large number of small crystals would be formed in most instances. However, other combinations of the boric acid and borax can be effectively used, including boric acid alone and borax alone. The use of boric acid alone enables only about 3% titania to be dissolved therein regardless of the temperature to which the compounds are heated but causes rapid crystallization by vaporization of the boric acid. Also, the use of borax alone results in an excess of soda in the melt which is vaporized at a relatively low temperature and is lost. Soda ($Na_2O$) is preferably present in combination with the boric anhydride ($B_2O_3$) at high temperatures is a ratio of 1:3 ($Na_2O/B_2O_3$), which is obtained by the use of one mole of boric acid. The choice of boric acid or borax or mixtures of such or of other alkali borates in such mixtures provides a generally water soluble glass matrix and the crystals can be recovered by water extraction.

It is to be understood that the soda employed in the melt need not be added in the form of borax but can be added alone or in other forms, if used at all. Other alkali metal oxides, including potassium, rubidium, and cesium—those alkali metal oxides having an atomic number of at least 11—can be used. Soda is preferred, however, because it provides greater solubility for the crystal-forming material and also because it is inexpensive, easily obtained, and can be found in nature, e.g. in borax.

Rather than cooling the matrix and crystal-forming material after a homogeneous melt is attained, the melt can be maintained at an elevated temperature sufficiently high to cause the soda or other alkali metal oxide to volatilize, causing the solubility of the crystal-forming material in the matrix to decrease. Therefore, upon continued heating, the crystal-forming material crystallizes as the solubility lessens and forms a fibrous mass similar to that shown in FIGS. 2 and 3, as long as the flow of the matrix and crystal-forming material is maintained. However, this process leaves a boric acid matrix which is much less water soluble, resulting in increased difficulty in removing the matrix from the crystalline fibers. The soda is also lost in this process, or at least cannot be easily recovered, which is a disadvantage in large scale production of the fibers where re-use of all possible materials gives greatest economy.

Zircon and zirconia crystals have been made by this process from zircon, boric anhydride, and borax in equimolar proportions. These were maintained at a temperature of 2650° F. for a period of 8 hours during which time some of the soda and $B_2O_3$ volatilized and the solubility of the zircon in the matrix decreased, causing the zircon to crystallize as both zircon and zirconia acicular crystalline fibers. The melter was then shut off and cooled to ambient temperature. Pure zirconia and pure zircon crystals over one inch in length were recovered.

Blue, oxygen-deficient titania crystalline fibers have been produced by heating the matrix and crystal-forming material in a reducing or oxygen-deficient atmosphere either as they are being made or after they are formed. This can also be accomplished by making the fibers in a graphite crucible. In addition, the blue fibers have been made by subjecting the conventional fibers to hot turpentine or other organic vapors or to magnesium or zinc vapors, some oxygen from the crystals reacting to oxidize the organic or metal vapor and leaving the fibers slightly oxygen deficient. The fibers can also be subjected to a flame which is deficient in oxygen e.g. because fuel is burned with less than the stoichiometric ratio of oxygen. These fibers are capable of conducting electricity which renders them potentially useful for semiconductor applications and transistors.

The physical characteristics and other properties of the fibers can also be modified by adding iron, chromium, columbium, or tantalum in very small amounts, up to an equimolecular quantity, to the combinations of crystal-forming materials and matrix materials where such materials enter into the space lattice of titania crystals in place of some of the titanium atoms.

Various modifications of the above described embodiments of the invention will be apparent to those skilled in the art and it is to be understood that such modifications can be made without departing from the spirit and scope of the invention, as defined in the accompanying claims.

We claim:

1. A reinforced body consisting of substantially pure crystalline fibers selected from the group consisting of titania, zirconia, and zircon, as determined by X-ray diffraction, in a vitreous matrix consisting essentially of boric anhydride.

2. A reinforced body consisting of substantially pure titania crystalline fibers, as determined by X-ray diffraction, in a vitreous matrix consisting essentially of boric anhydride.

3. A process for producing crystalline fibers which comprises melting a matrix material of boric anhydride, dissolving in the resulting melted matrix a crystal-forming material capable of forming acicular crystals, said crystal-forming material being selected from the group consisting of titania, zirconia, and zircon, cooling the crystal-forming material and the matrix material to a temperature near the upper end of a nucleation range of said crystal-forming material to cause a relatively few number of nuclei to be formed in the matrix, continuing to cool said crystal-forming material and matrix, as the crystal-forming material crystallizes and the nucleation range drops, to a temperature at which most of the crystal-forming material is crystallized from the matrix, further cooling the crystals and matrix to ambient temperature, and removing the matrix material from the resulting crystals.

4. A process for producing crystalline fibers which comprises melting a matrix material of boric anhydride, dissolving in the resulting melted matrix a crystal-forming material capable of forming acicular crystals, said crystal-forming material being selected from the group consisting of titania, zirconia, and zircon, cooling the crystal-forming material and the matrix material to a temperature near an end of a nucleation range of said crystal-forming material, which end is closer to a crystal-growing range of said crystal-forming material than is the other end, to cause a relatively few number of nuclei to be formed in the matrix, continuing to cool said crystal-forming material and matrix as the crystal-forming material crystallizes and the nucleation range drops, to a temperature at which most of the crystal-forming material is crystallized from the matrix, further cooling the crystals and matrix to ambient temperature, and removing the matrix material from the resulting crystals.

5. A process for producing crystalline fibers which comprises melting a matrix material of boric anhydride, dissolving in the resulting melted matrix a crystal-forming material capable of forming acicular crystals, said crystal-forming material being selected from the group consisting of titania, zirconia, and zircon, rapidly cooling the matrix and said crystal-forming material through a crystal-growing range of the crystal-forming material to a temperature near an upper end of a nucleation range of said crystal-forming material at which temperature relatively few nuclei are formed, and continuing to cool said matrix and said crystal-forming material as the crystal-forming material crystallizes from the matrix to cause further crystallization of the crystal-forming material on the partially formed crystals.

6. A process for producing crystalline fibers which comprises melting a matrix material of boric anhydride, dissolving titania in the resulting melted matrix, cooling the matrix and the titania to a temperature near an upper end of a nucleation range of the titania at which temperature relatively few nuclei are formed, and continuing to cool said matrix and the titania as the titania crystallizes from the matrix to cause further crystalization of the titania on the partially formed crystals.

7. A process for producing crystalline fibers which comprises melting a matrix material of boric anhydride, dissolving zircon in the resulting melted matrix, cooling the matrix and the zircon to a temperature near an upper end of a nucleation range of the zircon at which temperature relatively few nuclei are formed, and continuing to cool said matrix and the zircon as the zircon crystallizes from the matrix to cause further crystallization of the zircon on the partially formed crystals.

8. A process for producing crystalline fibers which comprises melting a matrix material of boric anhydride, dissolving zirconia in the resulting melted matrix, cooling the matrix and the zirconia to a temperature near an upper end of a nucleation range of the zirconia at which temperature relatively few nuclei are formed, and continuing to cool said matrix and the zirconia as the zirconia crystallizes from the matrix to cause further crystallization of the zirconia on the partially formed crystals.

9. A process for producing small crystalline fibers which comprises melting a matrix of boric anhydride, dissolving in the resulting matrix a crystal-forming material capable of forming acicular crystals, said crystal-forming material being selected from the group consisting of titania, zirconia, and zircon, cooling said crystal-forming material and said matrix material to a temperature in a middle portion of a nucleation range of said crystal-forming material to cause a large number of nuclei to form in said matrix material and to grow therein at a relatively low rate, continuing to cool said matrix and said crystal-forming material, as the crystal-forming material crystallizes from the matrix and the nucleation range decreases in temperature, to a temperature at which a substantial part of the crystal-forming material has crystallized, and cooling the resulting crystals and matrix to ambient temperature.

10. A process according to claim 9 characterized by agitating the matrix during the cooling thereof.

11. A process according to claim 9 characterized by blowing air through the matrix at least during the cooling thereof.

12. A process for producing crystalline fibers which comprises melting a matrix material of boric anhydride, dissolving in the resulting melted matrix a crystal-forming material capable of forming acicular crystals, said crystal-forming material being selected from the group consisting of titania, zirconia, zircon, cooling the crystal-forming material and the matrix materials to cause said crystal-forming material to crystallize into acicular crystalline bodies, and removing the matrix materials from said crystals.

13. A process for producing crystalline fibers which comprises melting a matrix material of boric anhydride, dissolving in the resulting melted matrix a crystal-forming material capable of forming acicular crystals, said crystal-forming material being selected from the group consisting of titania, zirconia, and zircon, and cooling the crystal-forming material and the matrix materials to cause said crystal-forming material to crystallize into acicular crystalline bodies.

14. A process for producing crystalline fibers comprising dissolving titania in a matrix consisting essentially of boric anhydride, reducing the degree of solubility of the titania in said matrix to cause the titania to gradually crystallize, causing relative movement between the resulting crystals and the combination of the matrix and the remaining titania, and continuing to decrease the degree of solubility of the titania in said matrix as the crystals form to cause additional titania to come out of solution on the previously formed crystals.

15. A process for producing crystalline fibers comprising dissolving zircon in a matrix consisting essentially of boric anhydride, reducing the degree of solubility of the zircon in said matrix to cause the zircon to gradually crystallize, causing relative movement between the resulting crystals and the combination of the matrix and the remaining zircon, and continuing to decrease the degree of solubility of the zircon in said matrix as the crystals form to cause additional zircon to come out of solution on the previously formed crystals.

16. A process for producing crystalline fibers comprising dissolving zirconia in a matrix consisting essentially of boric anhydride, reducing the degree of solubility of the zirconia in said matrix to cause the zirconia to gradually crystallize, causing relative movement between the resulting crystals and the combination of the matrix and the remaining zirconia, and continuing to decrease the degree of solubility of the zirconia in said matrix as the crystals form to cause additional zirconia to come out of solution on the previously formed crystals.

17. A process for producing crystalline fibers which comprises dissolving a material capable of forming acicular crystals and selected from the group which consists of titania, zirconia, and zircon in a matrix material consisting essentially of boric anhydride, reducing the degree of solubility of said crystal-forming material in said matrix to cause said crystal-forming material to crystallize, and moving said crystal-forming material and said matrix past the growing crystalline fibers to cause said crystal-forming material coming out of solution to deposit on the ends of the partially formed crystals.

18. A process for producing crystalline fibers comprising dissolving a material capable of forming acicular crystals and selected from the group which consists of titania, zircon, and zirconia, in a matrix of boric anhydride, cooling said crystal-forming material and said matrix to cause said crystal-forming material to crystallize, causing relative movement between the resulting crystals and the combination of the matrix and crystal-forming material, and continuing to cool said matrix and the remaining dissolved crystal-forming material while continuing relative movement between said matrix and crystal-forming material to crystallize additional crystal-forming material on the ends of the previously formed crystals.

19. A homogeneous melt from which acicular crystals can be made which consists essentially of boric anhydride, and a material capable of forming acicular crystals selected from the group consisting of titania, zirconia, and zircon.

20. A reinforced body consisting of substantially pure zircon crystalline fibers, as determined by X-ray diffraction, in a vitreous matirx consisting essentially of boric anhydride.

21. A reinforced body consisting of substantially pure zirconia crystalline fibers, as determined by X-ray diffraction, in a vitreous matrix consisting essentially of boric anhydride.

References Cited by the Examiner
UNITED STATES PATENTS

| | | | |
|---|---|---|---|
| 2,876,074 | 3/1959 | Johnson | 23—202 |
| 2,980,510 | 4/1961 | Berry | 23—202 |
| 3,012,957 | 12/1961 | Pease | 23—202 |
| 3,030,183 | 4/1962 | Berry | 23—202 |

TOBIAS E. LEVOW, *Primary Examiner.*